United States Patent
Koh (10) Patent No.: US 12,291,178 B2
(45) Date of Patent: May 6, 2025

(54) APPARATUS, METHOD AND COMPUTER READABLE STORAGE MEDIUM FOR CHANGING BRAKE MODE USING BRAKE PEDAL

(71) Applicants: Hyundai Motor Company, Seoul (KR); Kia Corporation, Seoul (KR)

(72) Inventor: Sang Bum Koh, Suwon-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 162 days.

(21) Appl. No.: 18/203,503

(22) Filed: May 30, 2023

(65) Prior Publication Data

US 2024/0262321 A1 Aug. 8, 2024

(30) Foreign Application Priority Data

Feb. 8, 2023 (KR) .................. 10-2023-0016600

(51) Int. Cl.
*B60T 7/04* (2006.01)

(52) U.S. Cl.
CPC ........... *B60T 7/042* (2013.01); *B60T 2220/04* (2013.01)

(58) Field of Classification Search
CPC .......................... B60T 7/042; B60T 2220/04
USPC ........................................................ 701/70
See application file for complete search history.

(56) References Cited

U.S. PATENT DOCUMENTS 9,731,721 B1 * 8/2017 Wilder .................... B60T 8/266

FOREIGN PATENT DOCUMENTS

| CN | 112689581 A | * | 4/2021 | |
|---|---|---|---|---|
| CN | 113396294 A | * | 9/2021 | ............ B60T 13/142 |
| CN | 113874263 A | * | 12/2021 | ............ B60T 13/142 |
| CN | 113905936 A | * | 1/2022 | ............. B60T 13/14 |
| KR | 10-2019-0061252 A | | 6/2019 | |

OTHER PUBLICATIONS

CN-113905936-A (Jin et al.) (Jan. 7, 2022) (Machine Translation) (Year: 2022).*

* cited by examiner

*Primary Examiner* — Mahmoud Gimie (74) *Attorney, Agent, or Firm* — MORGAN, LEWIS & BOCKIUS LLP (57) ABSTRACT

An apparatus for changing a brake mode using a brake pedal, includes a processor; and a storage medium recording at least one program configured to be executable by the processor, the at least one program including instructions; a first determination unit configured for determining whether a first condition for changing the brake mode is satisfied, wherein the brake mode refers to driver's required deceleration including a different inclination according to a pedal stroke or a pedal effort of the brake pedal, is satisfied; a second determination unit configured for determining whether the pedal stroke of the brake pedal and a pressing time of the brake pedal satisfy a second condition, in response that the first condition is satisfied; and a control unit of changing a current brake mode for a brake system including the brake pedal, in response that the second condition is satisfied.

18 Claims, 7 Drawing Sheets

| DIVISION | FIRST CUT VALVE | SECOND CUT VALVE | SIM VALVE | CLUSTER | BRAKE MODE |
|---|---|---|---|---|---|
| WHEN PEDAL IS RELEASED | OPEN | OPEN | CLOSE | - | Comport |
| PRESS PEDAL (FIRST AND SECOND CONDITIONS ARE NOT SATISFIED) | CLOSE | CLOSE | OPEN | - | Comport |
| PRESS PEDAL (FIRST AND SECOND CONDITIONS ARE SATISFIED) | CLOSE | CLOSE | OPEN → CLOSE → OPEN | NOTIFY CHANGE IN BRAKE MODE | Mild |
| WHEN PEDAL IS RELEASED | OPEN | OPEN | CLOSE | - | Mild |
| PRESS PEDAL (FIRST AND SECOND CONDITIONS ARE NOT SATISFIED) | CLOSE | CLOSE | OPEN | - | Mild |
| PRESS PEDAL (FIRST AND SECOND CONDITIONS ARE SATISFIED) | CLOSE | CLOSE | OPEN → CLOSE → OPEN | NOTIFY CHANGE IN BRAKE MODE | Sport |
| WHEN PEDAL IS RELEASED | OPEN | OPEN | CLOSE | - | Sport |
| PRESS PEDAL (FIRST AND SECOND CONDITIONS ARE NOT SATISFIED) | CLOSE | CLOSE | OPEN | - | Sport |
| PRESS PEDAL (FIRST AND SECOND CONDITIONS ARE SATISFIED) | CLOSE | CLOSE | OPEN → CLOSE → OPEN | NOTIFY CHANGE IN BRAKE MODE | Comport |

APPARATUS, METHOD AND COMPUTER READABLE STORAGE MEDIUM FOR CHANGING BRAKE MODE USING BRAKE PEDAL

CROSS-REFERENCE TO RELATED APPLICATION(S)

The present application claims priority to Korean Patent Application No. 10-2023-0016600 filed on Feb. 8, 2023, the entire contents of which is incorporated herein for all purposes by this reference.

BACKGROUND OF THE PRESENT DISCLOSURE

Field of the Present Disclosure

The present application relates to an apparatus, a method, and a computer readable storage medium for changing a brake mode using a brake pedal.

Description of Related Art

In a brake system, brake force is differentiated according to an operational range of the brake pedal (pedal stroke or pedal effort), and thereby, the driver can directly select the desired brake feeling. A brake mode may include, for example, a mild mode, a comfort mode, a sports mode, and the like.

Such a brake mode may be changed using a physical button linked to a separate driving mode. For example, when a button of which a driving mode is an eco-mode is pressed, the brake mode may be changed a mild mode linked to the driving mode, when a button of which a driving mode is a comfort mode is pressed, the brake mode linked to the driving mode may be changed to a comfort mode, and when a button of which a driving mode is a sports mode is pressed, the brake mode may be changed to a sports mode linked to the driving mode. Alternatively, the brake mode may be changed using a separate physical button regardless of the driving mode described above, or the brake mode may be changed in a user selection menu displayed on a touch screen.

However, such a conventional brake mode changing method causes inconvenience to a user, and is not intuitive.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus, method, and computer-readable storage medium for changing a brake mode using a brake pedal, which can contribute to user convenience when the brake mode is changed and inform a change in brake mode more intuitively.

According to an aspect of the present disclosure, provided is an apparatus for changing a brake mode using a brake pedal, the apparatus including: a processor; and a storage medium recording at least one program configured to be executable by the processor, the at least one program including instructions; a first determination unit for determining whether a first condition for changing the brake mode is satisfied, wherein the brake mode refers to driver's required deceleration having a different inclination according to a pedal stroke or a pedal effort; a second determination unit for determining whether the pedal stroke of the brake pedal and a pressing time of the brake pedal satisfy a second condition, in response that the first condition is satisfied; and a control unit for changing a current brake mode for a brake system including the brake pedal, in response that the second condition is satisfied.

According to an aspect of the present disclosure, provided is a method for changing a brake mode using a brake pedal, the method including: a first operation, in a first determination unit, for determining whether a first condition for changing the brake mode is satisfied, wherein the brake mode refers to driver's required deceleration having a different inclination according to a pedal stroke or a pedal effort; a second operation, in a second determination unit, for determining whether the pedal stroke of the brake pedal and a pressing time of the brake pedal satisfy a second condition, in response that the first condition is satisfied; and a third operation, in a control unit, for changing a current brake mode for a brake system including the brake pedal, in response that the second condition is satisfied.

According to an aspect of the present disclosure, provided is a computer-readable storage medium in which a program for executing the method by a computer is recorded.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments in an exemplary embodiment of the present disclosure will be described with reference to the accompanying drawings. The present disclosure may, however, be exemplified in many different forms and should not be construed as being limited to the specific embodiments set forth herein. Rather, these embodiments are provided so that the present disclosure will be thorough and complete, and will fully convey the scope of the present disclosure to those skilled in the art. In the drawings, the same reference numerals will be used throughout to designate the same or like elements, and the shapes and dimensions of elements may be exaggerated for clarity, and elements indicated by the same reference numerals in the drawings are the same elements.

Figure 1:
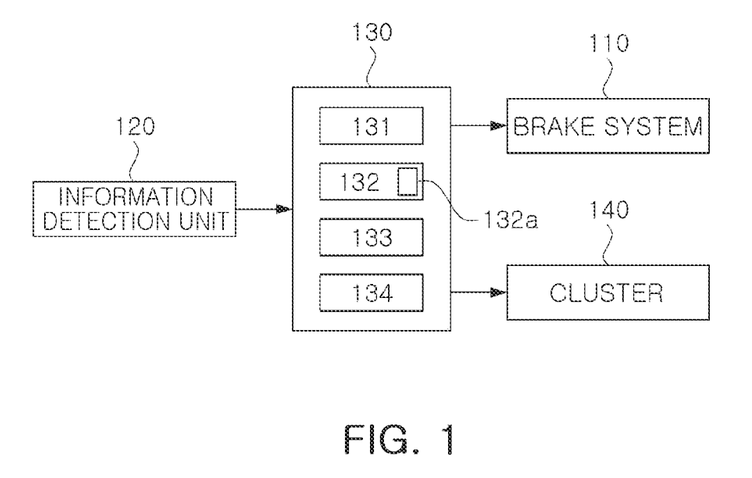
FIG. 1 is a block diagram of an entire system including an apparatus for changing a brake mode using a brake pedal according to an exemplary embodiment of the present disclosure.

FIG. 1 is a block diagram of an entire system including an apparatus for changing a brake mode using a brake pedal according to an exemplary embodiment of the present disclosure. Meanwhile, FIG. 2 is a diagram illustrating a brake system including a pedal simulator according to an exemplary embodiment of the present disclosure.

First, as illustrated in FIG. 1, the entire system may include a brake system 110, an information detection unit 120, an apparatus 130 for changing a brake mode, and a cluster 140.

First, a brake system 110 according to an exemplary embodiment of the present disclosure will be described with reference to FIG. 2.

Figure 2:
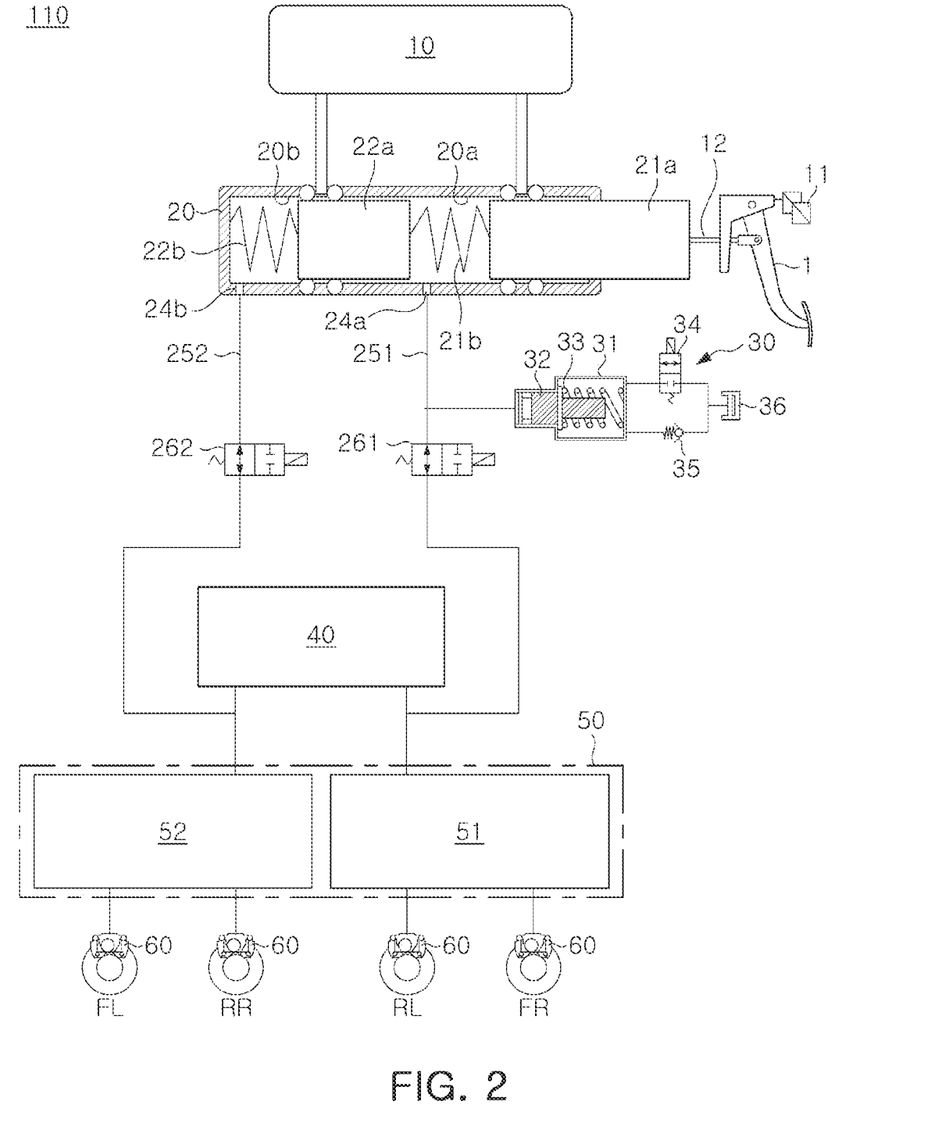
FIG. 2 is a diagram illustrating a brake system including a pedal simulator according to an exemplary embodiment of the present disclosure.

As illustrated in FIG. 2, the brake system 110 may include a master cylinder 20 normally generating hydraulic pressure, a reservoir 10 coupled to an upper portion of the master cylinder 20 to store oil, an input rod 12 pressing the master cylinder 20 according to an effort of the brake pedal 1, a wheel cylinder 60 to which hydraulic pressure is transmitted, so that brake of each wheel (RR, RL, FR, FL) is performed, a pedal simulator 30 providing reaction force according to the effort of the brake pedal 1, a hydraulic supply device 40 mechanically operating by receiving a driver's will to brake from a pedal displacement sensor 11 for detecting displacement of the brake pedal 1, a hydraulic circuit 50 including first and second hydraulic circuits 51 and 52 controlling a flow of hydraulic pressure transmitted to the wheel cylinder 60 provided on the two wheels RR, RL, FR, and FL, respectively, a first cut valve 261 provided in a first backup passage 251 connecting a first hydraulic port 24a and the first hydraulic circuit 51 to control a flow of hydraulic pressure, and a second cut valve 262 provided in a second backup passage 252 connecting a second hydraulic port 24b and the second hydraulic circuit 52 to control the flow of hydraulic pressure.

The master cylinder 20 may have at least one chamber to generate hydraulic pressure. For example, the master cylinder 20 may include a first master chamber 20a and a second master chamber 20b.

A first piston 21a connected to the input rod 12 is provided in the first master chamber 20a, and a second piston 22a is provided in the second master chamber 20b. The first master chamber 20a fluidically communicates with the first hydraulic port 24a so that oil flows in and out, and the second master chamber 20b fluidically communicates with the second hydraulic port 24b so that oil flows in and out. The first hydraulic port 24a may be connected to the first backup passage 251, and the second hydraulic port 24b may be connected to the second backup passage 252.

One master chamber 20a of the two master chambers 20a and 20b may be connected to a right front wheel FR and a left rear wheel RL of a vehicle through the first backup passage 251 and the first hydraulic circuit 51, and the other one master chamber 20b thereof may be connected to a left front wheel FL and a right rear wheel RR through the second backup passage 252 and the second hydraulic circuit 52. Alternatively, unlike illustrated in FIG. 2, it may be variously configured, like one of the two master chambers is connected to the two front wheels FR and FL and the other one master chamber thereof is connected to the two rear wheels RR and RL.

Furthermore, a first spring 21b may be provided between the first piston 21a and the second piston 22a of the master cylinder 20, and a second spring 22b may be provided between the second piston 22a and an end portion of the master cylinder 20. That is, the first piston 21b may be accommodated in the first master chamber 20a, and the second piston 22b may be accommodated in the second master chamber 20b. The first spring 21b and the second spring 22b are compressed by the first piston 21a and the second piston 22a moving as the displacement of the brake pedal 1 changes and elastic force is stored therein. When force pushing the first piston 21a is smaller than the elastic force, the first and second pistons 21a and 22a are returned to their original state by use of restoring elastic force stored in the first spring 21b and the second spring 22b.

Meanwhile, the pedal simulator 30 may include a simulation chamber 31 provided to store oil flowing out of the first hydraulic port 24a of the master cylinder 20, a reaction piston 32 provided in the simulation chamber 31, a reaction spring 33 for elastically supporting it, a simulator valve 34 (hereinafter, referred to as a 'sim valve') connected to a rear end portion of the simulation chamber 31, a check valve 35, and a reservoir 36.

The reaction piston 32 and the reaction spring 33 may be provided to include a displacement within a certain range within the simulation chamber 31 by oil flowing into the simulation chamber 31.

A front end portion of the simulation chamber 31 may be connected to the first backup passage 251, and a rear end portion of the simulation chamber 31 may be connected to the reservoir 36 through the sim valve 34 and the check valve 35.

The sim valve 34 may be configured as a normally closed solenoid valve that remains normally closed. When the driver applies a pedal effort to the brake pedal 1, the sim valve 34 may be opened to transfer oil in the simulation chamber 31 to the reservoir 36.

Furthermore, when the reaction force piston 32 returns while the sim valve 34 is open, the oil in the reservoir 36 may flow therein so that an interior of the simulation chamber 31 may be entirely filled with oil.

The check valve 35 may allow the oil in the simulation chamber 31 to flow into the first master chamber 20a, and block that the oil in the first master chamber 20a flows into the simulation chamber 31 through a passage where the check valve 35 is provided.

The operation of the pedal simulator 30 is described. When the driver applies an effort to the brake pedal 1, the sim valve 34 may be open, and oil may press the reaction force piston 32. In the instant case, while the reaction force piston 32 compresses the reaction force spring 33, the oil in the simulation chamber 31 is transferred to the reservoir 36. In the present process, the driver is provided with pedal feeling.

Conversely, when the driver releases the effort provided to the brake pedal 1, the reaction piston 32 may return to an original position of thereof by elastic force of the reaction spring 33, and the oil in the reservoir 36 may flow into the simulation chamber 31 so that an inside of the simulation chamber 31 may be filled with oil. In the instant case, the oil filled at the front end portion of the reaction piston 32 in the simulation chamber 31 may return to the master cylinder 20 through a passage where the sim valve 34 is provided and a passage where the check valve 35 is provided.

Meanwhile, the hydraulic supply device 40 provides oil pressure transmitted to the wheel cylinder 60. The hydraulic pressure supply device 40 may be variously provided. For example, a piston moved by a driving force of a motor may transmit hydraulic pressure to the wheel cylinder 60.

The hydraulic circuit 50 may include a first hydraulic circuit 51 and a second hydraulic circuit 52 receiving hydraulic pressure and controlling wheels FR, RL. RR, and FL, respectively. For example, the first hydraulic circuit 51 may control the right front wheel FR and the left rear wheel RL, and the second hydraulic circuit 52 may control the left front wheel FL and the right rear wheel RR. A wheel cylinder 60 is provided on each of the wheels FR, FL. RR, and RL to receive hydraulic pressure to perform brake.

Referring back to FIG. 1, the information detection unit 120 may detect information on a pedal stroke of the brake pedal or a pedal effort of the brake pedal, a vehicle speed, a shifting stage of a gear, and an inclination of a road. The detected information may be delivered to the apparatus 130 for changing a brake mode.

Meanwhile, the apparatus 130 for changing a brake mode may change a current brake mode when detecting a brake pedal operation under a specific condition. The apparatus 130 for changing a brake mode may include a first determination unit 131, a second determination unit 132, a control unit 133, and a storage unit 134.

In an exemplary embodiment of the present disclosure, the brake mode may refer to driver's requested deceleration including a different inclination according to a pedal stroke or a pedal effort, and may be changed according to a predetermined order. Here, the predetermined order may be, for example, Sports mode→Comfort mode→Mild mode→Sports mode, but it should be noted that this is only for helping understanding of the present disclosure, but is not limited thereto. Each brake mode will be described later.

Hereinafter, a brake mode according to an exemplary embodiment of the present disclosure will be described with reference to FIG. 3.

Figure 3:
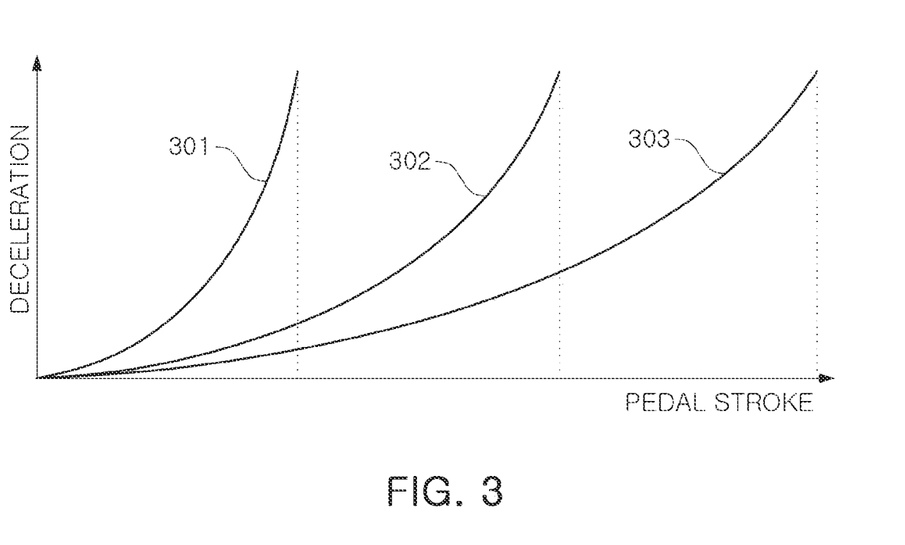
FIG. 3 is a diagram for illustrating a brake mode according to an exemplary embodiment of the present disclosure.

FIG. 3 is a diagram for illustrating a brake mode according to an exemplary embodiment of the present disclosure. In FIG. 3, reference numeral 301 denotes a brake curve in a Sports mode, reference numeral 302 denotes a brake curve in a Comfort mode, and reference numeral 303 denotes a brake curve in a Mild mode. Although FIG. 3 illustrates driver's requested deceleration for a pedal stroke, but it may be equally applied in the case of driver's requested deceleration for a pedal effort.

As illustrated in FIG. 3, each of the three brake modes may include a different inclination. That is, the brake curves may be set so that a magnitude of driver's requested deceleration corresponding to the pedal stroke is different in each of the three brake modes.

In the Sports mode, an increase/decrease rate of the deceleration for the change in pedal stroke input by the driver is relatively large, compared to other modes, and also a magnitude of the driver's requested deceleration corresponding to a same pedal stroke is relatively large, compared to other modes. Therefore, in the Sports mode, a large brake force may be generated even when the driver operates the brake pedal 1 with a smaller pedal operation amount, that is, a pedal stroke, compared to other modes.

Meanwhile, in the Comport mode, an increase/decrease rate of the brake curve may be set to be much smaller than the Sports mode, and in the Mild mode, an increase/decrease rate of the brake curve may be set to be much smaller than the Comport mode.

The exemplary embodiment of FIG. 3 is merely an example, and the number of brake modes in an exemplary embodiment of the present disclosure is not necessarily limited to three as described above, and may be further subdivided so that more differentiated modes may be set.

Meanwhile, the first determination unit 131 may be configured to determine whether a first condition for changing a brake mode is satisfied. The determination result may be transmitted to a second determination unit 132 to be described later.

The first determination unit 131 may be configured to conclude that the first condition is satisfied when the gear shifting is in a P-range, the vehicle speed is 0, and the inclination angle of the road is less than or equal to a predetermined inclination angle. Here, it should be noted that the predetermined inclination angle may be set by tuning, and is not limited to a specific numerical value.

Next, when the first condition is satisfied, the second determination unit 132 may be configured to determine whether a pedal stroke of the brake pedal 1 and a pressing time of the brake pedal 1 satisfy the second condition. The determination result may be transmitted to a control unit 133 to be described later.

When the pedal stroke of the brake pedal 1 is equal to or greater than a predetermined pedal stroke, and a time at which the pedal stroke of the brake pedal 1 is equal to or greater than the predetermined pedal stroke is equal to or greater than a predetermined pressing time, the second determination unit 132 may be configured to conclude that the second condition is satisfied. Here, it should be noted that the predetermined pressing time may be set by tuning, and is not limited to a specific value herein.

To the present end, the second determination unit 132 resets a timer 132a and then counts a time from a point in the time at which the pedal stroke is equal to or greater than the predetermined pedal stroke, and when the counted time is equal to or greater than a predetermined pressing time, the second determination unit 132 may be configured to determine a second condition is satisfied.

Meanwhile, when the second condition described above is satisfied, the control unit 133 may change a current brake mode for the brake system 110.

Furthermore, the control unit 133 may be configured to generate vibration of the brake pedal 1 by opening and closing the sim valve 34 provided in the pedal simulator 30 when the second condition is satisfied.

That is, for a predetermined time period, by closing the open sim valve 34 and then opening the sim valve 34 again, a 'click' vibration may be generated in the brake pedal 1, and thereby, a change in brake mode may be more intuitively notified. It should be noted that the predetermined time period described above may be set by tuning, and is not limited to a specific value herein.

Furthermore, when the second condition described above is satisfied, the control unit 133 may read the current brake mode stored in a storage unit 134 to be described later, and change the read current brake mode to a following brake mode according to a predetermined order.

This is to consider a case of changing the brake mode using a method as described in the related art, which is using a physical button linked to a separate driving mode, in addition to changing the brake mode using the brake pedal. Therefore, according to an exemplary embodiment of the present disclosure, when the second condition described above is satisfied, the current brake mode stored in the storage unit 134 to be described later, was first read, and then changed to a following brake mode of the read brake mode.

Furthermore, the control unit 133 may change the current brake mode to the following brake mode according to a predetermined order whenever the first and second conditions described above are satisfied.

Figure 4:
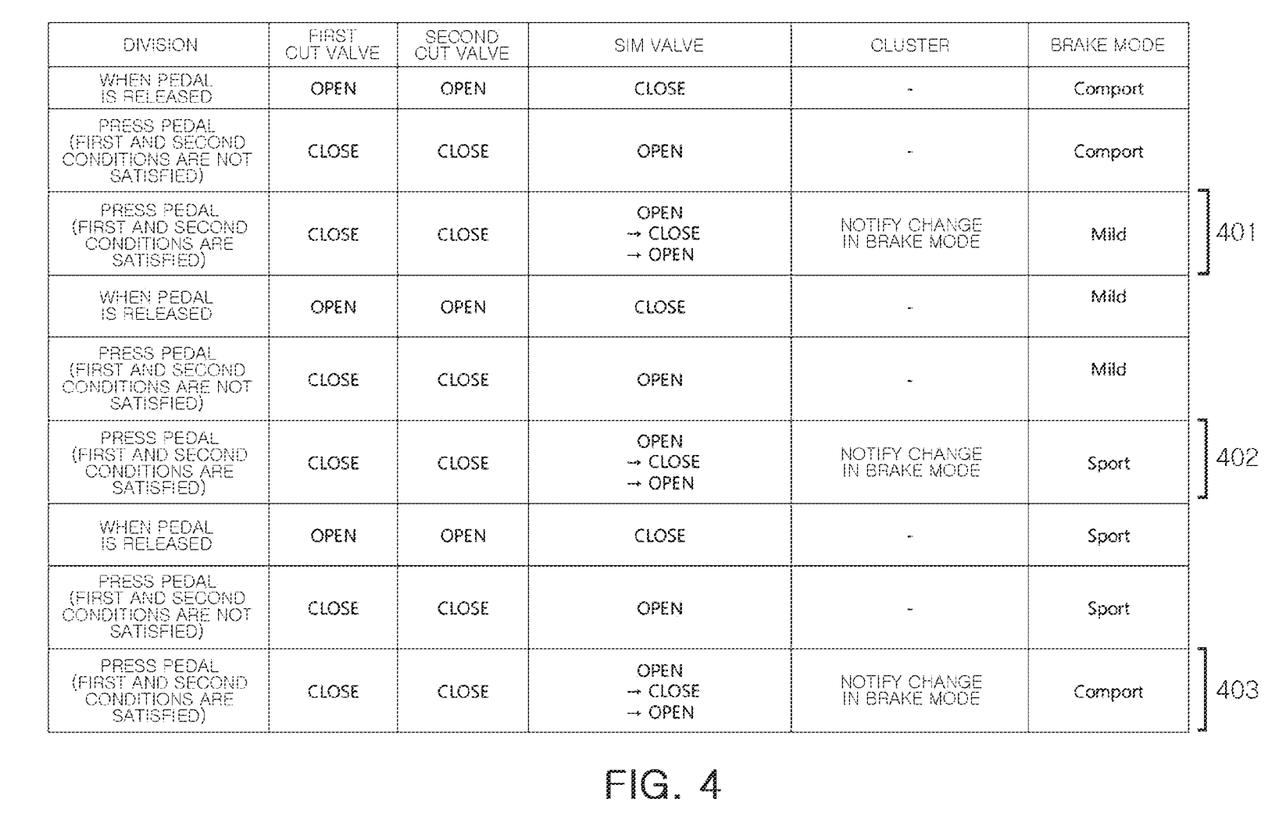
FIG. 4 is a diagram for illustrating a brake mode which is changed according to a predetermined order according to an exemplary embodiment of the present disclosure.

FIG. 4 is a diagram for illustrating a brake mode changed according to a predetermined order according to an exemplary embodiment of the present disclosure.

As illustrated in FIG. 4, when the first condition and the second condition are satisfied, the brake mode may be changed according to a predetermined order. For example, if the current brake mode is a Comfort mode, it may be changed to a Mild mode (see 401), if the current brake mode is a Mild mode, it may be changed to a Sports mode (see 402), and if the current brake mode is a Sports mode, it may be changed to a Comfort mode (see 403).

Furthermore. FIG. 4 illustrates states of a first cut valve 261, a second cut valve 262, and a sim valve 34 in various states. That is, when the pedal is released, the first cut valve 261 and the second cut valve 262 may be open, and the sim valve 34 may be closed. Furthermore, when the brake pedal 1 is pressed but the first condition and the second condition are not satisfied, the first cut valve 261 and the second cut valve 262 may be closed, the valve 34 may be open. Furthermore, when the brake pedal 1 is pressed and the first condition and the second condition are satisfied, the first cut valve 261 and the second cut valve 262 may be closed, and the sim valve 34 may be closed. However, in the instant case, a vibration may be generated in the brake pedal 1 by closing the open sim valve 34 for a predetermined time period and then opening the same again.

Meanwhile, the storage unit 134 may be a storage medium storing programs for performing the above-described units 131, 132, and 133.

Meanwhile, the cluster 140 is a display device configured for displaying the changed brake mode.

Figure 5:
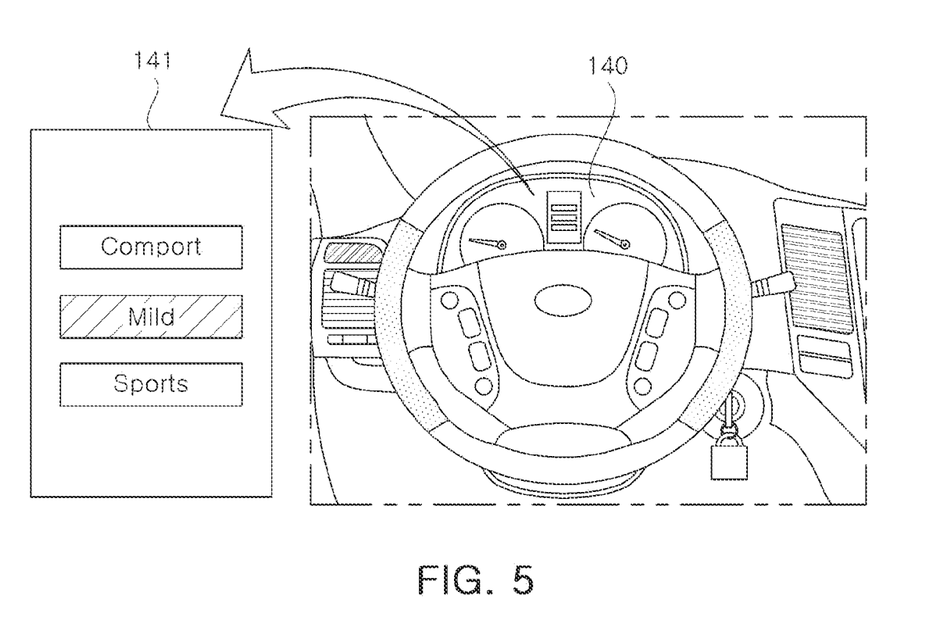
FIG. 5 is a diagram illustrating a brake mode displayed on a cluster according to an exemplary embodiment of the present disclosure.

FIG. 5 is a diagram illustrating a brake mode displayed on a cluster according to an exemplary embodiment of the present disclosure.

As illustrated in FIG. 5, when a brake mode is changed, the changed current brake mode may be displayed on a display unit 141 of the cluster 140. FIG. 5 illustrates the current brake mode is a Mild mode.

As described above, according to an exemplary embodiment of the present disclosure, the current brake mode is changed when an operation of the brake pedal is detected under a specific condition, contributing to user convenience.

Furthermore, according to an exemplary embodiment of the present disclosure, when the brake mode is changed, a vibration of the brake pedal is generated by opening and closing the sim valve provided in the pedal simulator, so that the change in brake mode may be more intuitively notified.

Furthermore, according to an exemplary embodiment of the present disclosure, because only a logic for changing the brake mode needs to be added to the existing system, implementation may be undertaken without adding cost or weight.

Figure 6:
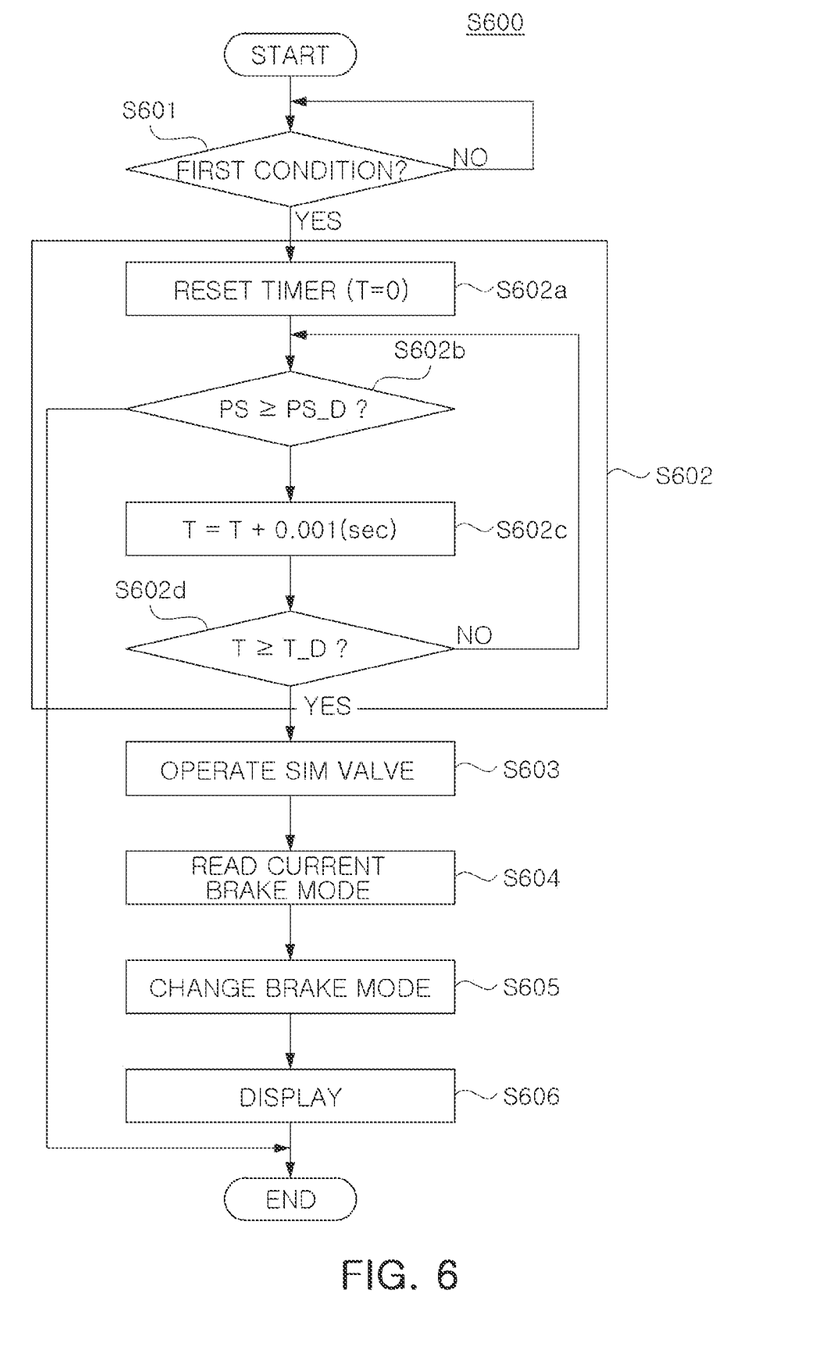
FIG. 6 is a flowchart illustrating a method for changing a brake mode using a brake pedal according to an exemplary embodiment of the present disclosure.

FIG. 6 is a flowchart illustrating a method for changing a brake mode using a brake pedal according to an exemplary embodiment of the present disclosure.

Hereinafter, a method for changing a brake mode using a brake pedal according to an exemplary embodiment of the present disclosure will be described with reference to FIG. 1, FIG. 2, FIG. 3. FIG. 4, FIG. 5 and FIG. 6 (S600). However, overlapping descriptions with those of FIG. 1, FIG. 2, FIG. 3, FIG. 4, and FIG. 5 are omitted for simplicity of the present disclosure.

First, as illustrated in FIGS. 1 to 6, the method (S600) for changing the brake mode using the brake pedal according to an exemplary embodiment of the present disclosure may be started by an operation for determining whether a first condition for changing the brake mode is satisfied in the first determination unit 131 (S601). The determination result may be delivered to a second determination unit 132 to be described later.

As described above, the first determination unit 131 may be configured to determine whether the first condition is satisfied when a gear shifting is in a P-range, a vehicle speed is 0, and an inclination angle of a road is less than or equal to a predetermined inclination angle.

Next, when the first condition is satisfied, the second determination unit 132 may be configured to determine whether a pedal stroke of the brake pedal 1 and a pressing time of the brake pedal 1 satisfy a second condition (S602). Here, when a pedal stroke of the brake pedal 1 is equal to or greater than a predetermined pedal stroke and a time at which the pedal stroke is equal to or greater than the predetermined pedal stroke is equal to or greater than a predetermined pressing time, the second determination unit 132 may be configured to conclude that the second condition is satisfied.

To the present end, the second determination unit 132 resets a timer 132*a* (T=0) (S602*a*) and is configured to determine whether a pedal stroke PS is equal to or greater than a predetermined pedal stroke PS_D (S602*b*). When the pedal stroke PS is equal to or greater than the predetermined pedal stroke PS_D, a time is counted from the present point in time (S602*c*), and it may be determined whether the counted time T is equal to or greater than a predetermined pressing time T_D (S604*d*). When the counted time Tis equal to or greater than the predetermined pressing time T_D, it may be determined that the second condition is satisfied. Here, the counted time is illustrated as a specific numerical value of 0.001 second, but it should be noted that this is to help understanding of the present disclosure, and the present disclosure is not limited to specific numerical values.

When the second condition described above is satisfied, the control unit 133 may change a current brake mode for the brake system 110 (S605).

As described above, the brake mode in an exemplary embodiment of the present disclosure may refer to driver's requested deceleration including different inclinations according to a pedal stroke or a pedal effort, and may be changed according to a predetermined order.

Meanwhile, according to an exemplary embodiment of the present disclosure, when the second condition is satisfied, the control unit 133 may be configured to generate a vibration of the brake pedal 1 by operating the sim valve 34 provided in the pedal simulator 30 (S603).

The control unit 133 may close and the open sim valve 34 and then open the same again for a predetermined time period, to generate a 'click' vibration in the brake pedal 1, and accordingly, a change in brake mode may be more intuitively notified. It should be noted that the predetermined time period described above may be set by tuning, and is not limited to a specific value here.

Furthermore, according to an exemplary embodiment of the present disclosure, as described above, when the second condition described above is satisfied, the control unit 133 may read a current brake mode stored in a storage unit 134 to be described later (S604), and change the read current brake mode to a following brake mode according to a predetermined order (S605).

The above-described control unit 133 may change the current brake mode to the following brake mode according to a predetermined order whenever the first condition and second condition described above are satisfied.

Thereafter, the cluster 140 may display the changed brake mode (S606).

As described above, according to an exemplary embodiment of the present disclosure, the current brake mode may be changed when the operation of the brake pedal is detected under a specific condition, contributing to user convenience.

Furthermore, according to an exemplary embodiment of the present disclosure, when the brake mode is changed, a vibration of the brake pedal is generated by opening and closing the sim valve provided in the pedal simulator, so that the change in the brake mode may be more intuitively notified.

Furthermore, according to an exemplary embodiment of the present disclosure, because only a logic for changing the brake mode needs to be added to the existing system, implementation may be undertaken without adding cost or weight.

Figure 7:
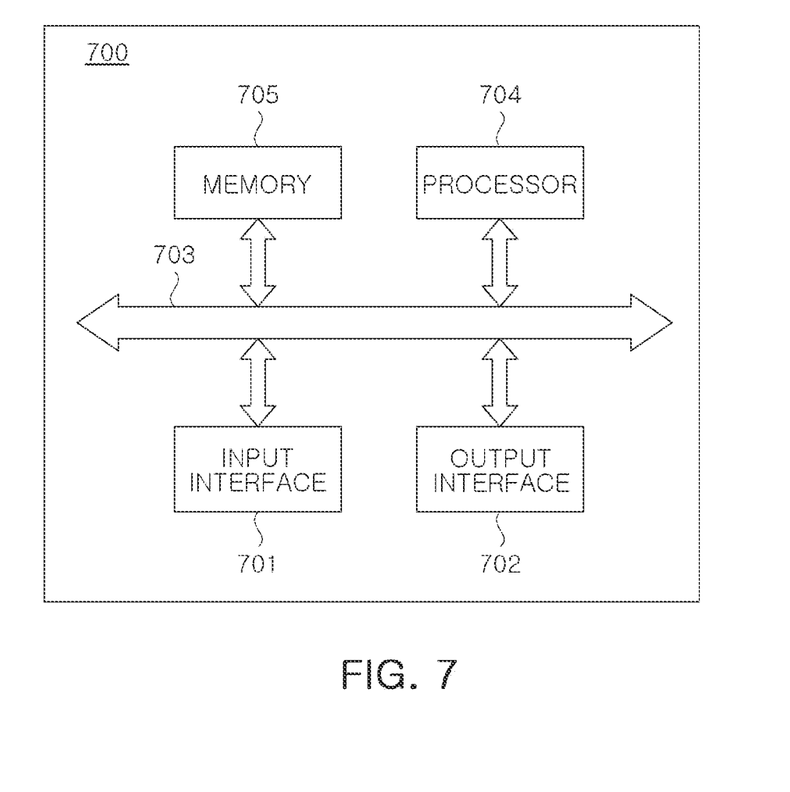
FIG. 7 is a block diagram of a computer device configured for fully or partially implementing an apparatus for changing a brake mode using a brake pedal according to an exemplary embodiment of the present disclosure.

Meanwhile, FIG. 7 is a block diagram of a computer device that can fully or partially implement the apparatus 130 for changing the brake mode using a brake pedal according to an exemplary embodiment of the present disclosure, and may be applied to the apparatus 130 for changing the brake mode using the brake pedal illustrated in FIG. 1.

As illustrated in FIG. 6, a computer device 700 may include an input interface 701, an output interface 702, a processor 704, and a memory 705, and the input interface 701, the output interface 702, the processor 704, and the memory 705 may be interconnected via a system bus 703.

In an exemplary embodiment of the present disclosure, the memory 705 may be used to store a program, instruction or code, and the processor 704 may execute the program, instruction or code stored in the memory 705, and may receive a signal by controlling the input interface 701, and may transmit a signal by controlling the output interface 702. The above-described memory 705 may include a read-only memory and a random access memory, and may provide instructions and data to the processor 704.

In an exemplary embodiment of the present disclosure, it should be understood that the processor 704 may be a central processing unit (CPU), another general-purpose processor, a digital signal processor (DSP), an application specific integrated circuit (ASIC), a field programmable gate array (FPGA) or other programmable logic devices, a discrete gate or a transistor logic device, a discrete hardware component, or the like. The general purpose processor may be a microprocessor, or the processor may be any conventional processor, or the like.

In one implementation process, each method of FIG. 1 may be achieved by an integrated logic circuit of hardware or an instruction in a form of software in the processor 704. The method included in relation to the exemplary embodiment of the present disclosure may be implemented to be performed and completed by a hardware processor, or to be performed and completed by a combination of hardware and software modules of the processor. The software module may be stored in a storage medium such as random access memory, flash memory, read-only memory, programmable read-only memory or electrically erasable programmable memory, a register, and the like. The storage medium may be positioned in the memory 705, and the processor 704 may read information from the memory 705 and may implement the above-described method in combination with hardware. To avoid duplication, detailed descriptions thereof are omitted herein.

Meanwhile, in an exemplary embodiment of the present disclosure, '~unit' may be implemented in various manners, for example, a processor, program instructions executed by the processor, software modules, microcodes, computer program products, logic circuits, application-specific integrated circuits, firmware, and the like, or may be implemented by hardware.

As set forth above, according to an exemplary embodiment of the present disclosure, a current mode is changed when an operation of a brake pedal is detected, under a specific condition, contributing to user convenience.

Furthermore, according to an exemplary embodiment of the present disclosure, when the brake mode is changed, vibration of the brake pedal is generated by opening and closing a sim valve included in a pedal simulator, so that the change in the brake mode may be more intuitively notified.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back". "inside". "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for changing a brake mode using a brake pedal, the apparatus comprising:
    a processor, and
    a storage medium recording at least one program configured to be executable by the processor, the at least one program including instructions;
    a first determination unit configured for determining whether a first condition for changing the brake mode is satisfied, wherein the brake mode refers to driver's required deceleration including a different inclination according to a pedal stroke or a pedal effort of the brake pedal;
    a second determination unit configured for determining whether the pedal stroke of the brake pedal and a pressing time of the brake pedal satisfy a second condition, in response that the first condition is satisfied; and
    a control unit of changing a current brake mode for a brake system including the brake pedal, in response that the second condition is satisfied,
    wherein the first determination unit is configured for concluding that the first condition is satisfied, when a gear shifting is in a P-range, a vehicle speed is 0, and an inclination angle of a road is less than or equal to a predetermined inclination angle.

2. The apparatus of claim 1, wherein the second determination unit is configured for concluding that the second condition is satisfied, when the pedal stroke of the brake pedal is equal to or greater than a predetermined pedal stroke and a time at which the pedal stroke of the brake pedal is equal to or greater than the predetermined pedal stroke is equal to or greater than a predetermined pressing time period.

3. The apparatus of claim 2, wherein the second determination unit is further configured to:
    reset a timer,
    count a time from a point in the time at which the pedal stroke is equal to or greater than the predetermined pedal stroke, and
    conclude that the second condition is satisfied, in response that the counted time is equal to or greater than the predetermined pressing time period.

4. The apparatus of claim 1,
    wherein the brake system further includes a pedal simulator providing reaction force according to an effort of the brake pedal, and
    wherein the control unit is configured to generate a vibration of the brake pedal by opening and closing a sim valve provided in the pedal simulator, in response that the second condition is satisfied.

5. The apparatus of claim 4, wherein the control unit is further configured to close the open sim valve, and then to open the closed sim valve again, for a predetermined time period.

6. The apparatus of claim 1, wherein the brake mode includes a plurality of brake modes including a predetermined order, and each brake mode including a different inclination.

7. The apparatus of claim 6,
    wherein the storage medium is configured for storing the current brake mode for the brake system, and
    wherein the control unit is configured to read the stored current brake mode in response that the second condition is satisfied, and to change the read current brake mode to a following brake mode according to the predetermined order.

8. The apparatus of claim 6, wherein the control unit is further configured to change the current brake mode to a following brake mode according to the predetermined order, in response that the first condition and the second condition are satisfied.

9. A method for changing a brake mode using a brake pedal, the method comprising:
    determining, by a first determination unit, whether a first condition for changing the brake mode is satisfied, wherein the brake mode refers to driver's required deceleration including a different inclination according to a pedal stroke or a pedal effort of the brake pedal;
    determining, by a second determination unit, whether the pedal stroke of the brake pedal and a pressing time of the brake pedal satisfy a second condition, in response that the first condition is satisfied; and changing, by a control unit, a current brake mode for a brake system including the brake pedal, in response that the second condition is satisfied, wherein the first determination unit is configured to conclude that the first condition is satisfied, when a gear shifting is in a P-range, a vehicle speed is 0, and an inclination angle of a road is less than or equal to a predetermined inclination angle.

10. The method of claim 9, wherein the second determination unit is configured to conclude that the second condition is satisfied, when the pedal stroke of the brake pedal is equal to or greater than a predetermined pedal stroke, and a time at which the pedal stroke of the brake pedal is equal to or greater than the predetermined pedal stroke is equal to or greater than a predetermined pressing time period.

11. The method of claim 10, wherein the determining of whether the pedal stroke of the brake pedal and the pressing time of the brake pedal satisfy the second condition includes:

resetting a timer;

counting a time from a point in the time at which the pedal stroke is equal to or greater than the predetermined pedal stroke; and determining that the second condition is satisfied, when the counted time is equal to or greater than the predetermined pressing time period.

12. The method of claim 9, wherein the brake system further includes a pedal simulator providing reaction force according to an effort of the brake pedal, and wherein the changing of the current brake mode for the brake system, includes generating a vibration of the brake pedal by opening and closing a sim valve provided in the pedal simulator, in response that the second condition is satisfied.

13. The method of claim 12, wherein the generating of the vibration of the brake pedal includes closing the open sim valve, and then opening the closed sim valve again, for a predetermined time period.

14. The method of claim 9, wherein the changing of the current brake mode further includes displaying the changed brake mode in a cluster.

15. The method of claim 9, wherein the brake mode includes a plurality of brake modes including a predetermined order, and each brake mode including a different inclination.

16. The method of claim 15, wherein the changing the brake mode further includes storing the current brake mode for the brake system, and wherein the changing of the current brake mode for the brake system includes:

reading the stored current brake mode, in response that the second condition is satisfied; and changing the read current break mode to a following brake mode according to the predetermined order.

17. The method of claim 15, wherein the changing of the current brake mode for the brake system includes changing the current brake mode to a following brake mode according to the predetermined order, in response that the first condition and the second condition are satisfied.

18. A computer-readable storage medium in which a program for executing the method of claim 9 is recorded on a computer.

* * * * *